US012670567B2

(12) United States Patent
Silverstein et al.

(10) Patent No.: US 12,670,567 B2
(45) Date of Patent: Jun. 30, 2026

(54) VIDEO CONFERENCE APPEARANCE VALIDATION AND REMEDIATION

(71) Applicant: International Business Machines Corporation, Armonk, NY (US)

(72) Inventors: Zachary A. Silverstein, Georgetown, TX (US); Melanie Dauber, Oceanside, NY (US); Jacob Ryan Jepperson, St. Paul, MN (US); Jeremy R. Fox, Georgetown, TX (US); Spencer Thomas Reynolds, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 18/300,432

(22) Filed: Apr. 14, 2023

(65) Prior Publication Data

US 2024/0346635 A1 Oct. 17, 2024

(51) Int. Cl.
G06T 7/00 (2017.01)
G06T 5/77 (2024.01)

(52) U.S. Cl.
CPC .............. G06T 7/0002 (2013.01); G06T 5/77 (2024.01); *G06T 2207/10016* (2013.01); *G06T 2207/20081* (2013.01); *G06T 2207/20084* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 7,564,476 B1* | 7/2009 | Coughlan | H04N 7/147 348/14.08 |
| 9,361,469 B2 | 6/2016 | Thiyagarajan et al. | |
| 10,402,655 B2 | 9/2019 | Javan-Roshtkhari et al. | |
| 11,350,059 B1 | 5/2022 | Swierk et al. | |
| 2020/0143842 A1 | 5/2020 | Doumbouya et al. | |
| 2020/0401811 A1* | 12/2020 | Yu | H04N 21/8456 |
| 2022/0295012 A1* | 9/2022 | Swierk | G06N 3/045 |

FOREIGN PATENT DOCUMENTS

| | | |
|---|---|---|
| CA | 2953394 C | 12/2015 |
| CN | 104361716 A | 2/2015 |
| CN | 114005153 A | 2/2022 |

OTHER PUBLICATIONS

"Amazon Rekognition Image", AWS, downloaded from the Internet on Jan. 26, 2023, 6 pages, <https://aws.amazon.com/rekognition/image-features/>.

(Continued)

*Primary Examiner* — Andrew M Moyer
*Assistant Examiner* — Caroline E. Depalma
(74) *Attorney, Agent, or Firm* — Monchai Chuaychoo

(57) ABSTRACT

An approach for preventing anomalous appearance characteristics of a user during a video conference. The approach receives a user's video feed from a video conference comprising the user's video feed. The approach analyzes the user's video feed based on a comparison with a reference appearance model associated with the user. The approach detects, based on the analysis, anomalous appearance characteristics associated with the user. The approach notifies the user of the anomalous appearance.

17 Claims, 2 Drawing Sheets

(56)  References Cited

OTHER PUBLICATIONS

"Video Conferencing Market Size, Share, Trends & Growth [2029]",
Fortune Business Insights, Hardware & Software IT Services,
downloaded from the Internet on Jan. 26, 2023, 10 pages, <https://
www.fortunebusinessinsights.com/Industry-reports/video-conferencing-
market-100293>.
"A System for Detecting Appropriate Dress Code in Virtual Meet-
ing", An IP.com Prior Art Database Technical Disclosure, Authors
et. al.: Disclosed Anonymously, IP.com No. IPCOM000257923D,
IP.com Electronic Publication Date: Mar. 23, 2019, 3 pages.
"Hand Mirror: A one-click camera check, right from the menu bar",
downloaded from the Internet on Jan. 26, 2023, 9 pages, <https://
handmirror.app>.
Bailey, Lily, "Worried About Doing Something Embarrassing on
Zoom? The fear of doing something inappropriate or awkward
during a video call.", Because We Are Bad, psychologytoday.com,
posted Sep. 15, 2020, 9 pages.
IBM, "Live event streaming solution", IBM Watson Media, down-
loaded from the Internet on Jan. 26, 2023, <https://www.ibm.com/
watson/media/live-event-streaming-services>, 7 pages.
Peters, Jay, "This handy Mac app is a one-click way to check how
you look before your next video call: Make sure there's no spinach
in your teeth", TECH/APPLE/MACOS, theverge.com, published
online Mar. 19, 2020, 5 pages.
Ustik, Georgina, "Stop embarrassing yourself in Zoom calls—use
this app to check your face", thenextweb.com, posted online on
Nov. 26, 2020, 6 pages.

* cited by examiner

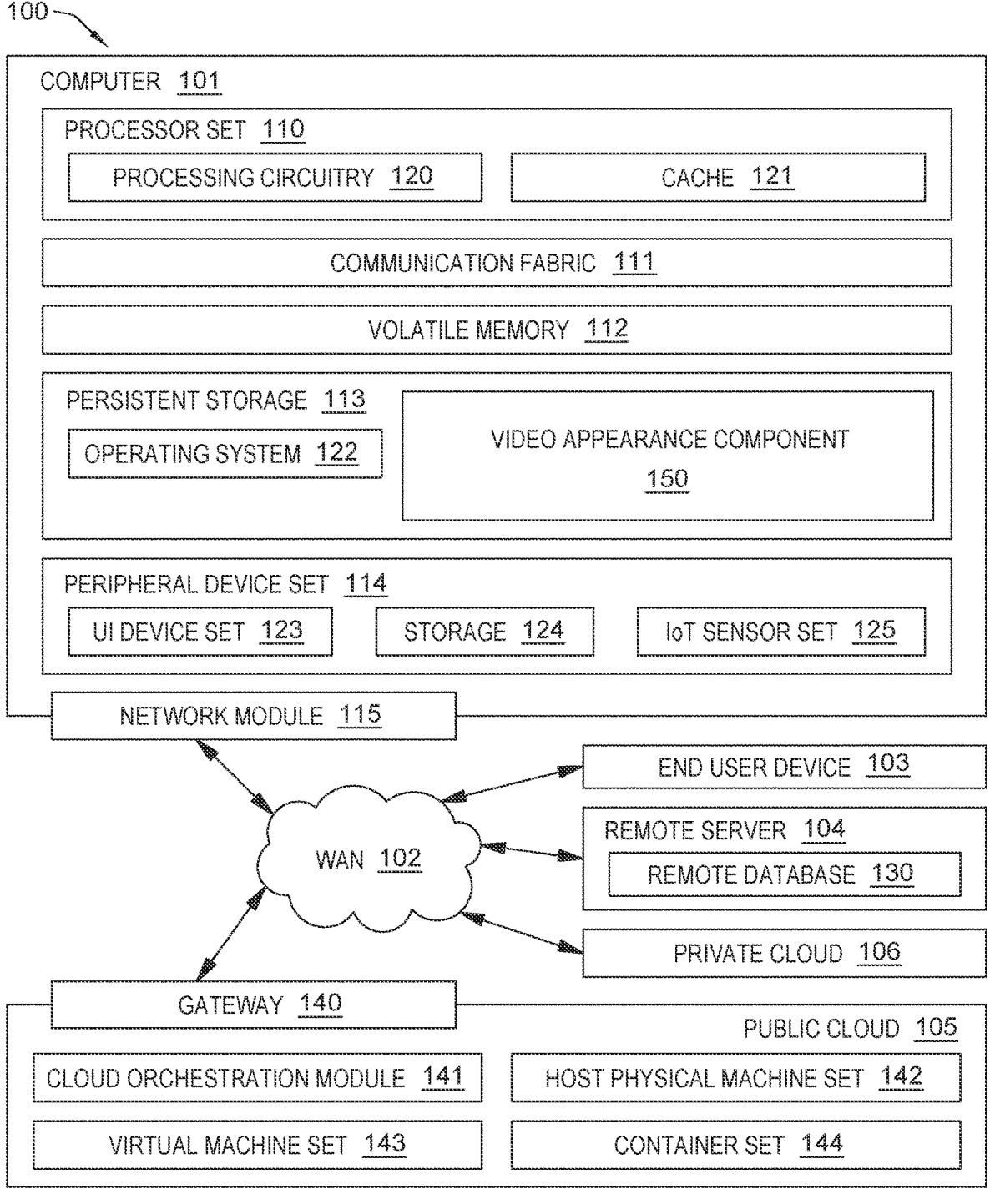

100

COMPUTER　101

PROCESSOR SET　110

PROCESSING CIRCUITRY　120

CACHE　121

COMMUNICATION FABRIC　111

VOLATILE MEMORY　112

PERSISTENT STORAGE　113

OPERATING SYSTEM　122

VIDEO APPEARANCE COMPONENT
150

PERIPHERAL DEVICE SET　114

UI DEVICE SET　123

STORAGE　124

IoT SENSOR SET　125

NETWORK MODULE　115

END USER DEVICE　103

REMOTE SERVER　104

REMOTE DATABASE　130

WAN　102

PRIVATE CLOUD　106

GATEWAY　140

PUBLIC CLOUD　105

CLOUD ORCHESTRATION MODULE　141

HOST PHYSICAL MACHINE SET　142

VIRTUAL MACHINE SET　143

CONTAINER SET　144

FIG. 1

VIDEO CONFERENCE APPEARANCE VALIDATION AND REMEDIATION

TECHNICAL FIELD

The present invention relates generally to video conferencing, and specifically, to validating video appearance and suggesting remedial actions for detected anomalies.

BACKGROUND

The global video conferencing market size was USD 5.77 billion in 2020. The global impact of COVID-19 has been unprecedented and staggering, with global video conferencing witnessing a positive demand shock across all regions amid the pandemic. Based on analysis, the global video conferencing market exhibited a significant growth of 8.1% in 2020 compared to the average year-on-year growth during 2017-2019.

The global video conferencing market is projected to grow from USD 6.28 billion in 2021 to USD 12.99 billion in 2028 at a compound annual growth rate (CAGR) of 10.9% during the 2021-2028 period. The significant change in CAGR is attributable to this market's demand and growth, returning to pre-pandemic levels once the pandemic is over.

While participating in video conference calls, a user may occasionally have a visual anomaly, that they do not realize, associated with their appearance. This can be embarrassing to the user and distracting to other attendees of the video conference with respect to the message the user is attempting to convey. If the presentation audience is broader than employees of the user's company, the user's company may also suffer embarrassment and reputation deterioration based on the user's appearance.

For example, a user may have a video conference presentation scheduled after lunch but during lunch, without noticing, created a stain on their clothing. The user proceeds to their afternoon video conference and reluctantly engages in self-deprecating humor to explain the stain once video conference attendees brought the existence of the stain to the user's attention.

A technology is desired to pre-screen a video conference attendee and provide notice of attendee appearance visual anomalies, suggestions of attendee remedial actions and suggestions of available system virtual remediation measures.

BRIEF SUMMARY

According to an embodiment of the present invention, a computer-implemented method for preventing anomalous appearance characteristics of a user during a video conference, the computer-implemented method comprising: receiving, by one or more processors, a user's video feed from a video conference comprising the user's video feed; analyzing, by the one or more processors, the user's video feed based on a comparison with a reference appearance model associated with the user; detecting, by the one or more processors, based on the analysis, anomalous appearance characteristics associated with the user; and notifying, by the one or more processors, the user of the anomalous appearance.

According to an embodiment of the present invention, a computer program product for preventing anomalous appearance characteristics of a user during a video conference, the computer program product comprising: one or more non-transitory computer readable storage media and program instructions stored on the one or more non-transitory computer readable storage media, the program instructions comprising: program instructions to receive a user's video feed from a video conference comprising the user's video feed; program instructions to analyze the user's video feed based on a comparison with a reference appearance model associated with the user; program instructions to detect, based on the analysis, anomalous appearance characteristics associated with the user; and program instructions to notify the user of the anomalous appearance.

According to an embodiment of the present invention, a computer system for preventing anomalous appearance characteristics of a user during a video conference, the computer system comprising: one or more computer processors; one or more non-transitory computer readable storage media; and program instructions stored on the one or more non-transitory computer readable storage media, the program instructions comprising: program instructions to receive a user's video feed from a video conference comprising the user's video feed; program instructions to analyze the user's video feed based on a comparison with a reference appearance model associated with the user; program instructions to detect, based on the analysis, anomalous appearance characteristics associated with the user; and program instructions to notify the user of the anomalous appearance.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 depicts a cloud computing environment and a high-level architecture, in accordance with at least one embodiment of the present invention.

DETAILED DESCRIPTION

Figure 2:
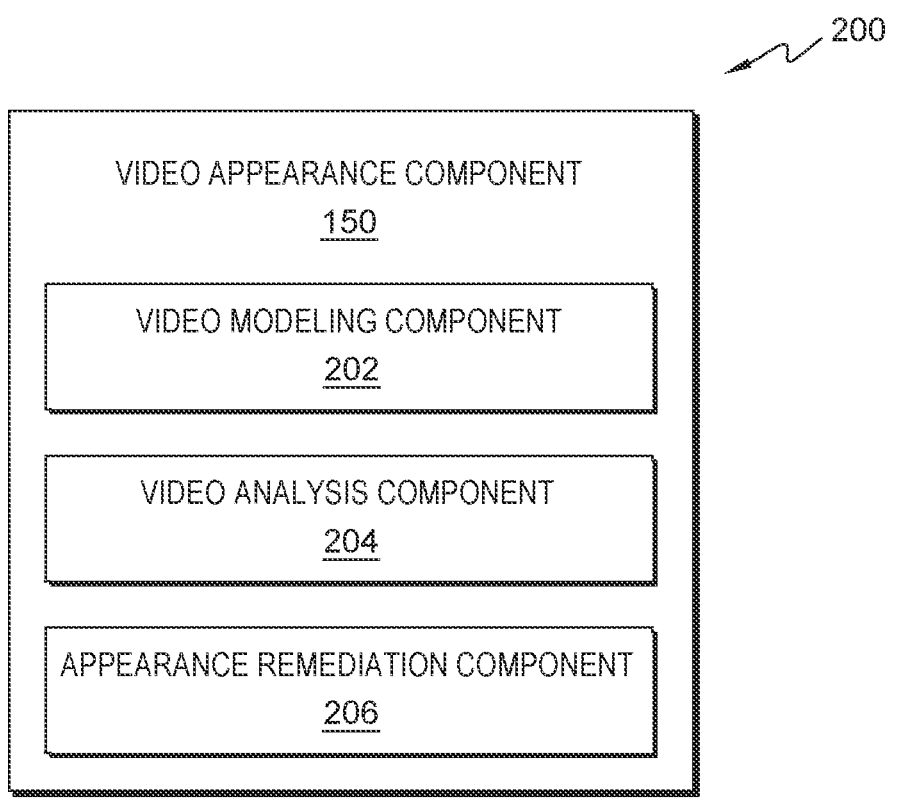
FIG. 2 depicts an exemplary detailed architecture, in accordance with at least one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as video appearance component 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or Open Source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 3:
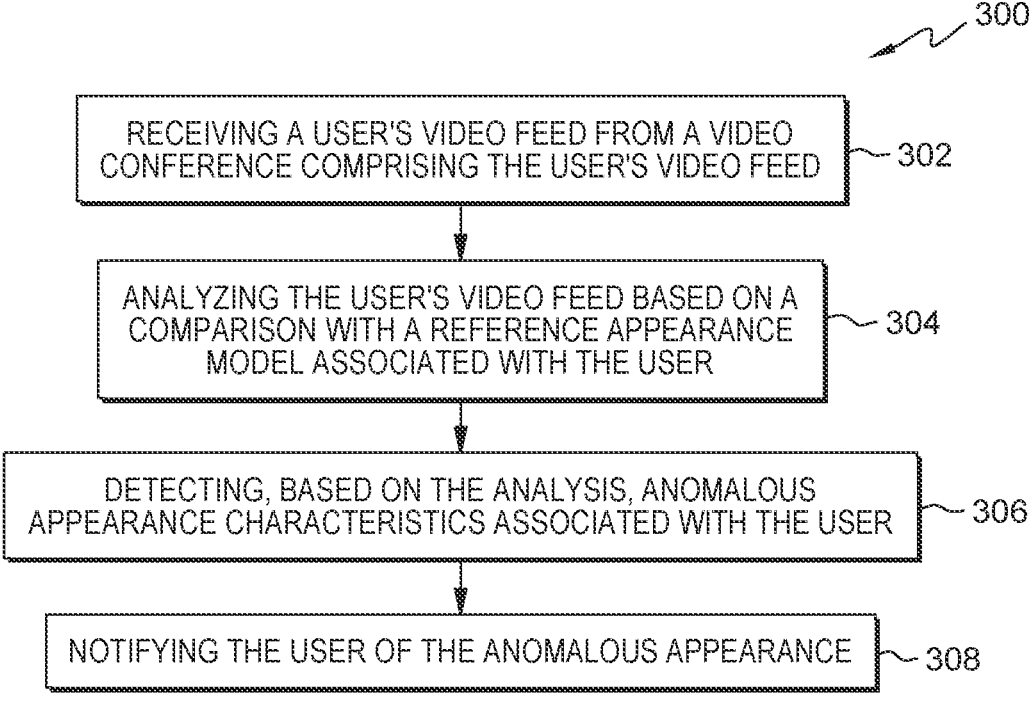
FIG. 3 is a flowchart of a method, in accordance with at least one embodiment of the present invention.

FIG. 2 is an exemplary detailed architecture for performing various operations of FIG. 3, in accordance with various embodiments. The architecture 200 may be implemented in accordance with the present invention in any of the environments depicted in FIGS. 1 and 3, among others, in various embodiments. Of course, more or less elements than those specifically described in FIG. 2 may be included in architecture 200, as would be understood by one of skill in the art upon reading the present descriptions.

Each of the steps of the method 300 (described in further detail below) may be performed by any suitable component of the architecture 200. A processor, e.g., processing circuit(s), chip(s), and/or module(s) implemented in hardware and/or software, and preferably having at least one hardware component, may be utilized in any device to perform one or more steps of the method 300 in the architecture 200. Illustrative processors include, but are not limited to, a central processing unit (CPU), an application specific integrated circuit (ASIC), a field programmable gate array (FPGA), etc., combinations thereof, or any other suitable computing device known in the art.

Architecture 200 provides a detailed view of at least some of the components of architecture 200. Architecture 200 can comprise video appearance component 150, which can further comprise video modeling component 202, video analysis component 204, and appearance remediation component 206.

In one aspect of an embodiment of the present invention, video appearance component 150 can collect and review a user's historical appearances and preferences, associated with attended video conferences, to generate a model of the user's "professional" appearance. It should be noted that in one example, a user's "professional" appearance can be characterized as an appearance that would not embarrass the user or result in a loss of good will for the company the user is representing. In another aspect of an embodiment of the present invention, video appearance component 150 can require the user to authorize use of the features of embodiments of the present invention and enable video appearance component 150 for use in their video conferencing application.

In one aspect of an embodiment of the present invention, video appearance component 150 can employ the generated model to periodically validate the user's appearance before and during the user's current video conference to confirm the user's appearance is within a predetermined range of the user's "professional" appearance. In another aspect of an embodiment of the present invention, video appearance component 150 can be incorporated into a video conferencing application or any image capturing application to provide the features and protections described subsequently.

In one aspect of an embodiment of the present invention, video modeling component 202 can provide the capability to employ historical image capture of video feeds to generate a "professional" appearance model of a user. In another aspect of an embodiment of the present invention, video modeling component 202 can provide the capability to generate a model of acceptable or themed appearance for a user's video feed based on model training such as, but not limited to, a Recurrent Neural Network (RNN). It should be noted that other architectural variants of RNNs can be employed by video modeling component 202. It should be noted that a themed appearance can be a "professional" appearance model created in light of the context of the audience of the video conference.

In one aspect of an embodiment of the present invention, video modeling component 202 can provide the capability to capture images from the user's video feed to build an RNN model of acceptable appearance during video conferences and professional presentations. It should be noted that the images may be captured on multiple events. For example, video modeling component 202 can capture images on events such as, but not limited to, timed-scheduled snapshots, randomly timed snapshots, user submitted snapshots, user joining video conference snapshot, user leaving video conference snapshot, user validation snapshot, etc. It should be noted that a user validation snapshot can be manually initiated at any point a user desires to inspect their appearance, such as, but not limited to, in the pre-join stage of a video conference meeting.

In one aspect of an embodiment of the present invention, video modeling component 202 can provide the capability to compile examples of a user's acceptable appearance to build a reference RNN model for use by the RNN. In another aspect of an embodiment of the present invention, video modeling component 202 can filter the compiled examples based on rules such as, but not limited to, removing images associated with informal meetings from the visual image dataset; contextualizing a meeting corpus and/or audience to ensure visual image professionalism is captured only for relevant events; user manually flagging meetings to be removed from the visual image dataset; user manually flagging meetings to be added to the visual image dataset; querying a user to confirm a captured visual image is representative of their professional appearance; etc.

In one aspect of an embodiment of the present invention, video modeling component 202 can provide the capability to crowdsource visual image data representative of common defects in a user's professional image, e.g., visual images representing food detected in a user's teeth or on a user's face. In another aspect of an embodiment of the present invention, video modeling component 202 can provide the capability to exercise an RNN trained on features such as, but not limited to, user clothing, user and object distance from camera, camera angle, user hygiene, user eye tracking, offensive object presence, e.g., food, devices, symbols, explicit images, etc.

In an alternate embodiment of the present invention, video modeling component 202 can detect, using natural language processing (NLP) of meeting agendas and communications associated with a meeting, e.g., emails, text messages, verbal communications, etc., meetings that are less formal and remove those data associated with a user's "professional" appearance model from the body of data used to generate the user's professional appearance. In one example of a less formal meeting, a user states in a communication, "I use my video conference tool to chat with colleagues on the weekend in my ratty old sweats, but the stains on my sweats would not be acceptable for a high-profile presentation."

In one aspect of an embodiment of the present invention, video analysis component 204 can provide the capability to monitor a user when the user is on a video conference and can periodically check if the user's current appearance conflicts with characteristics of the "professional" appearance model generated by video modeling component 202. In another aspect of an embodiment of the present invention, video analysis component 204 can provide the capability to compare, via an RNN, a current image of the user and the user's preferred image based on the "professional" appearance model, to determine a level of differentiation. In another aspect of an embodiment of the present invention, if a standard deviation of formality of the compared images is determined based on the trained "professional" appearance model, then video analysis component 204 can activate remedial actions via appearance remediation component 206.

In another aspect of an embodiment of the present invention, video analysis component 204 can provide the capability to evaluate a current image of a user during a pre-meeting evaluation. For example, before the user joins the video conference the user can manually request video analysis component 204 to perform an appearance evaluation to assure the user's appearance is up to user defined standards, based on the user's "professional" appearance model. It should be noted that video analysis component can be configured to perform a pre-meeting analysis each time the user attempts to join a meeting.

In one aspect of an embodiment of the present invention, appearance remediation component 206 can provide the capability to determine if a delta between a user's current image and a user's "professional" appearance model is detected. In another aspect of an embodiment of the present invention, appearance remediation component 206 can provide the capability to take remedial action including, but not limited to, sending the user a notification that their appearance does not meet the characteristics of the "professional" appearance model; automatically disabling the user's video feed to the video conference, if active; modifying the user's live appearance using a predetermined filter or Generative Adversarial Network (GAN). For example, obfuscating anomalous objects detected in a user's current image.

In another aspect of an embodiment of the present invention, appearance remediation component 206 can provide the capability to allow the user to continue with the current appearance image regardless of the current appearance image's agreement with the "professional" appearance model. It should be noted that the alert provided by video analysis component 204 could be a false alarm or it could be an incompletely trained model wherein the user is strengthening the "professional" appearance model. It should be noted that during any appearance alert scenario, appearance remediation component 206 can provide the capability to capture feedback based on communications through direct or alternative channels such as, but not limited to, other team members speaking during the video conference.

In an alternative embodiment of the present invention, appearance remediation component 206 can provide the capability to recommend changing the background or autonomously starting a predetermined virtual background for the user when video analysis component 204 detects an appearance event.

Looking to an example of an embodiment of the present invention, consider Jeremy, a video conference presenter having a high-profile remote presentation to a group of Senior Executives. Jeremy finishes lunch, a grilled chicken salad, returns to his office and runs his video conference application to prepare for his presentation. Jeremy selects the pre-meeting evaluation function of the video appearance component 150 to validate his professional appearance for the upcoming meeting. Video analysis component 204 collects a current image of Jeremy and compares the current image to Jeremy's "professional" appearance model created by video modeling component 202. Video analysis component 204 determines Jeremy's current image is outside a predetermined threshold of the "professional" image model based on detecting anomalous material stuck between Jeremy's teeth.

Appearance remediation component 206 notifies Jeremy of the non-compliant current image and provides Jeremy choices of how to proceed. Jeremey dashes to a restroom with his toothbrush and toothpaste to address the reported problem before his meeting begins. Upon return to his office, Jeremy reruns the pre-meeting evaluation function and is connected to his meeting.

Looking to another example of an embodiment of the present invention, consider Lynnessa, a video conference presenter having a sales presentation to a group of Senior Executives of her largest customer. Lynnessa has a chronic problem with a bloody nose. She keeps a box of tissues by her laptop in case of emergencies to prevent any blood drop stains on her shirt. Lynnessa is wearing a white shirt and jacket for her presentation and developed a bloody nose just prior to her presentation. Fortunately, she succeeded in stopping the drip a couple of minutes before her presentation. Unfortunately, Lynnessa was unaware that several drops landed on her shirt.

Lynnessa selects the pre-meeting evaluation function of the video appearance component 150 to validate her professional appearance for the upcoming meeting. Video analysis component 204 collects a current image of Lynnessa and compares the current image to Lynnessa's "professional" appearance model created by video modeling component 202. Video analysis component 204 determines Lynnessa's current image is outside a predetermined threshold of the "professional" image model based on detecting anomalous stains on Lynnessa's shirt. Appearance remediation component 206 notifies Lynnessa of the non-compliant current image and provides Lynnessa choices of how to proceed. Lynnessa has no time to change her shirt, so she selects the option to modify her live appearance using a predetermined filter. Accordingly, Appearance remediation component applies a white patch, slightly larger than the area of the stain, matching the shade of Lynnessa's shirt to virtually cover the stain. Lynnessa reruns the pre-meeting evaluation function and is connected to her meeting.

FIG. 3 is an exemplary flowchart of a method 300 for preventing anomalous appearance characteristics of a user during a video conference. At step 302, an embodiment can receive, via video modeling component 202, a user's video feed from a video conference comprising the user's video feed. At step 304, the embodiment can Analyze, via video analysis component 204, the user's video feed based on a comparison with a reference appearance model associated with the user. At step 306, the embodiment can detect, via video analysis component 204, based on the analysis, anomalous appearance characteristics associated with the user. At step 308, the embodiment can notify, via appearance remediation component 206, the user of the anomalous appearance.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for preventing anomalous appearance characteristics of a user during a video conference, the computer-implemented method comprising:
   receiving, by one or more processors, a user's video feed from a video conference comprising the user's video feed and meeting data, wherein the meeting data comprises of emails, text messages and verbal communications;
   creating, by a recurrent neural network (RNN), a reference appearance model of the user based on historical video appearances and user defined preferences;
   training the reference appearance model, by the recurrent neural network (RNN), based on the user's video feed;
   analyzing, by the recurrent neural network (RNN), the user's video feed based on a comparison with the reference appearance model associated with the user;
   determining whether the video conference is a formal meeting or an informal meeting, wherein the formal meeting is a meeting that is associated with presenting a professional appearance for the user and is determined by executing a pre-meeting evaluation function;
   in response to having determined that the video conference is the formal meeting, selecting a pre-meeting evaluation function to be performed on the user's video feed to validate the professional appearance of the user, where in the pre-meeting evaluation function further comprising:
   comparing the user's video feed against the reference appearance model based on a predetermined threshold to determine a standard deviation of formality;
   detecting, anomalous appearance characteristics associated with the user, wherein the anomalous appearance characteristics is characteristics that is outside the predetermined threshold of a professional image model;
   notifying, by the one or more processors, the user of an anomalous appearance, wherein the anomalous appearance is an appearance that is outside a predetermined threshold of the professional image model; and
   in response to having determined that the video conference is the informal meeting, detecting, by using a natural language processing (NLP) technique, informal data from the meeting data and removing of formal data associated with the reference appearance model.

2. The computer-implemented method of claim 1, wherein the reference appearance model is trained with a recurrent neural network.

3. The computer-implemented method of claim 1, further comprising:
   executing, by the one or more processors, remedial actions comprising at least one of obfuscation of the anomalous appearance characteristics or feed manipulation of the user's feed to eliminate the anomalous appearance characteristics.

4. The computer-implemented method of claim 1, wherein the reference appearance model is trained based on at least one of verbal communication or messaging associated with the video conference.

5. The computer-implemented method of claim 1, wherein the reference appearance model is trained based on user reaction to notification of the anomalous appearance.

6. The computer-implemented method of claim 1, wherein the reference appearance model is selected based on attendees of a video conference.

7. A computer program product for preventing anomalous appearance characteristics of a user during a video conference, the computer program product comprising:
   one or more non-transitory computer readable storage media and program instructions stored on the one or more non-transitory computer readable storage media, the program instructions comprising:
   program instructions to receive a user's video feed from a video conference comprising the user's video feed and meeting data, wherein the meeting data comprises of emails, text messages and verbal communications;
   program instructions to create, by a recurrent neural network (RNN), a reference appearance model of the user based on historical video appearances and user defined preferences;

program instructions to train the reference appearance model, by the recurrent neural network (RNN), based on the user's video feed;

program instructions to analyze, by the recurrent neural network (RNN), the user's video feed based on a comparison with the reference appearance model associated with the user;

program instructions to determine whether the video conference is a formal meeting or an informal meeting, wherein the formal meeting is a meeting that is associated with presenting a professional appearance for the user and is determined by executing a pre-meeting evaluation function;

in response to having determined that the video conference is the formal meeting, program instructions to select a pre-meeting evaluation function to be performed on the user's video feed to validate the professional appearance of the user, wherein the pre-meeting evaluation function further comprising:

program instructions to compare the user's video feed against the reference appearance model based on a predetermined threshold to determine a standard deviation of formality;

program instructions to detect, anomalous appearance characteristics associated with the user, wherein the anomalous appearance characteristics is characteristics that is outside the predetermined threshold of a professional image model;

program instructions to notify the user of the anomalous appearance, wherein the anomalous appearance is an appearance that is outside a predetermined threshold of the professional image model; and in response to having determined that the video conference is the informal meeting, program instructions to detect, by using a natural language processing (NLP) technique, informal data from the meeting data and removing of formal data associated with the reference appearance model.

8. The computer program product of claim 7, wherein the reference appearance model is trained with a recurrent neural network.

9. The computer program product of claim 7, further comprising:

program instructions to execute remedial actions comprising at least one of obfuscation of the anomalous appearance characteristics or feed manipulation of the user's feed to eliminate the anomalous appearance characteristics.

10. The computer program product of claim 7, wherein the reference appearance model is trained based on at least one of verbal communication or messaging associated with the video conference.

11. The computer program product of claim 7, wherein the reference appearance model is trained based on user reaction to notification of the anomalous appearance.

12. The computer program product of claim 7, wherein the reference appearance model is selected based on attendees of a video conference.

13. A computer system for preventing anomalous appearance characteristics of a user during a video conference, the computer system comprising:

one or more computer processors;

one or more non-transitory computer readable storage media; and program instructions stored on the one or more non-transitory computer readable storage media, the program instructions comprising:

program instructions to receive a user's video feed from a video conference comprising the user's video feed and meeting data, wherein the meeting data comprises of emails, text messages and verbal communications;

program instructions to create, by a recurrent neural network (RNN), a reference appearance model of the user based on historical video appearances and user defined preferences;

program instructions to train the reference appearance model, by the recurrent neural network (RNN), based on the user's video feed;

program instructions to analyze, by the recurrent neural network (RNN), the user's video feed based on a comparison with the reference appearance model associated with the user;

program instructions to determine whether the video conference is a formal meeting or an informal meeting, wherein the formal meeting is a meeting that is associated with presenting a professional appearance for the user and is determined by executing a pre-meeting evaluation function;

in response to having determined that the video conference is the formal meeting, program instructions to select a pre-meeting evaluation function to be performed on the user's video feed to validate the professional appearance of the user, wherein the pre-meeting evaluation function further comprising:

program instructions to compare the user's video feed against the reference appearance model based on a predetermined threshold to determine a standard deviation of formality;

program instructions to detect, anomalous appearance characteristics associated with the user, wherein the anomalous appearance characteristics is characteristics that is outside the predetermined threshold of a professional image model;

program instructions to notify the user of the anomalous appearance, wherein the anomalous appearance is an appearance that is outside a predetermined threshold of the professional image model; and in response to having determined that the video conference is the informal meeting, program instructions to detect, by using a natural language processing (NLP) technique, informal data from the meeting data and removing of formal data associated with the reference appearance model.

14. The computer system of claim 13, wherein the reference appearance model is trained with a recurrent neural network.

15. The computer system of claim 13, further comprising:

program instructions to execute remedial actions comprising at least one of obfuscation of the anomalous appearance characteristics or feed manipulation of the user's feed to eliminate the anomalous appearance characteristics.

16. The computer system of claim 13, wherein the reference appearance model is trained based on user reaction to notification of the anomalous appearance and based on at least one of verbal communication or messaging associated with the video conference.

17. The computer system of claim 13, wherein the reference appearance model is selected based on attendees of a video conference.

* * * * *